United States Patent
Palmer (10) Patent No.: US 10,690,231 B2
(45) Date of Patent: Jun. 23, 2020

(54) EPICYCLIC GEARTRAIN

(71) Applicant: ROLLS-ROYCE PLC, London (GB)

(72) Inventor: Chloe J Palmer, Derby (GB)

(73) Assignee: ROLLS-ROYCE PLC, London (GB)

( * ) Notice: Subject to any disclaimer, the term of this patent is extended or adjusted under 35 U.S.C. 154(b) by 9 days.

(21) Appl. No.: 16/217,216

(22) Filed: Dec. 12, 2018

(65) Prior Publication Data
US 2019/0211914 A1 Jul. 11, 2019

(30) Foreign Application Priority Data
Jan. 11, 2018 (GB) .................................. 1800413.5

(51) Int. Cl.
*F16H 57/04* (2010.01)
*F02C 7/36* (2006.01)
(Continued)

(52) U.S. Cl.
CPC ......... *F16H 57/0404* (2013.01); *B03C 1/284* (2013.01); *F02C 7/36* (2013.01);
(Continued)

(58) Field of Classification Search
CPC ............. F16H 57/0404; F16H 57/0402; F16H 57/0486; F16H 1/28; F02K 3/06; B03C 1/284; B03C 2201/18; F05D 2260/40311; F05D 2260/98; F02C 7/36; F04D 13/028; F04D 25/028
See application file for complete search history.

(56) References Cited

U.S. PATENT DOCUMENTS 8,084,912 B2 12/2011 Mizushima
8,568,099 B2 10/2013 Sabannavar et al.
(Continued)

FOREIGN PATENT DOCUMENTS

CN 202918118 U 5/2013
CN 105889458 A 8/2016
(Continued)

OTHER PUBLICATIONS

May 14, 2019 extended European Search Report in Application No. 18211625.1.
(Continued)

*Primary Examiner* — Aaron R Eastman
(74) *Attorney, Agent, or Firm* — Oliff PLC

(57) ABSTRACT

An epicyclic geartrain includes a debris collection arrangement. The epicyclic geartrain comprises a sun gear, a plurality of planet gears, with the plurality of planet gears being supported by a planet torque ring, and a ring gear. The planet gears meshingly surround the sun gear, and the ring gear meshingly surrounds the planet gears.

At least one of the sun gear, the plurality of planet gears, and the ring gear, is provided with a plurality of permanent magnet portions, and a debris collection element. The plurality of magnet portions is arranged as a circumferential array across a side of the corresponding gear. The debris collection element extends along the side face of the gear. The debris collection element is slidably positioned against the side face, such that rotation of the gear causes the debris collection element to remove any ferromagnetic debris particles that are magnetically attached to the side face.

11 Claims, 6 Drawing Sheets

(51) Int. Cl.
*B03C 1/28* (2006.01)
*F02K 3/06* (2006.01)
*F16H 1/28* (2006.01)

(52) U.S. Cl.
CPC ............... *F02K 3/06* (2013.01); *F16H 1/28* (2013.01); *F16H 57/0402* (2013.01); *F16H 57/0486* (2013.01); *B03C 2201/18* (2013.01); *F05D 2260/40311* (2013.01); *F05D 2260/98* (2013.01)

(56) References Cited

U.S. PATENT DOCUMENTS

2007/0095583 A1    5/2007  Lee
2012/0156034 A1    6/2012  Sabannavar et al.

FOREIGN PATENT DOCUMENTS

| | | |
|---|---|---|
| DE | 4417040 C1 | 6/1995 |
| DE | 10 2013 208428 A1 | 11/2013 |
| EP | 1986312 A1 | 10/2008 |
| GB | 1535190 A | 12/1978 |
| JP | 2006-022901 A | 1/2006 |
| WO | 2017/041854 A1 | 3/2017 |

OTHER PUBLICATIONS

May 25, 2018 Search Report issued in British Patent Application No. 1800413.5.
May 30, 2018 Search Report issued in British Patent Application No. 1800412.7.
Oct. 4, 2019 Office Action Issued in U.S. Appl. No. 16/217,243.

EPICYCLIC GEARTRAIN

This disclosure claims the benefit of UK Patent Application No. GB 1800413.5, filed on 11 Jan. 2018, which is hereby incorporated herein in its entirety.

FIELD OF THE DISCLOSURE

The present disclosure relates to a debris collection system for an epicyclic geartrain and particularly, but not exclusively, to a debris collection system for an epicyclic geartrain forming part of a geared turbofan engine.

BACKGROUND TO THE DISCLOSURE

A conventional turbofan engines is require to generate electrical power for ancillary systems both in the engine and the associated installation. Such conventional arrangements utilise an accessory gearbox that takes drive from the turbofan main shaft(s) and drives a separate electrical generator.

Figure 1:
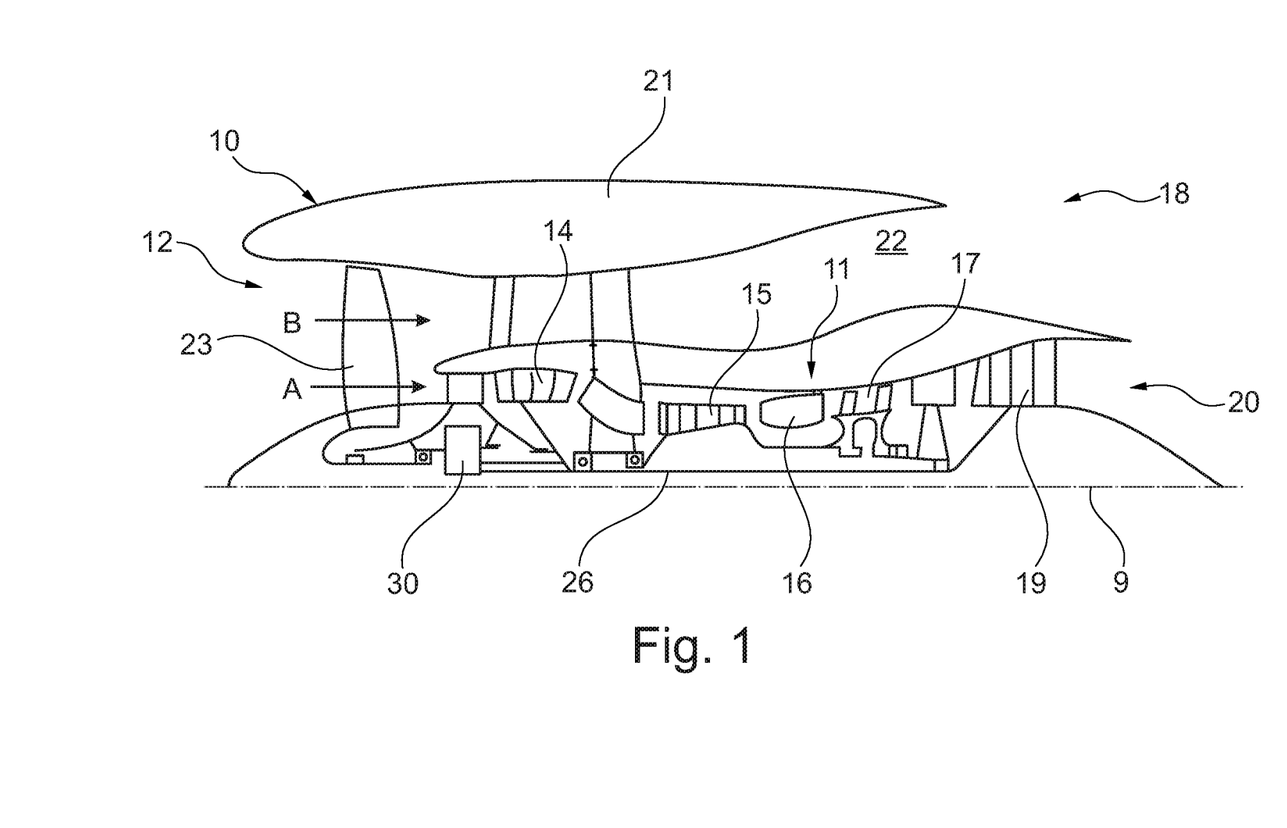
FIG. 1 shows a schematic sectional view of a geared turbofan gas turbine engine incorporating a debris collection arrangement for an epicyclic geartrain, according to the present disclosure.

FIG. 1 illustrates a gas turbine engine 10 having a principal rotational axis 9. The engine 10 comprises an air intake 12 and a propulsive fan 23 that generates two airflows A and B. The gas turbine engine 10 comprises a core engine 11 having, in axial flow A, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines, in axial flow B, a bypass duct 22 and a bypass exhaust nozzle 18. The fan 23 is attached to and driven by the low pressure turbine 19 via shaft 26 and epicyclic gearbox 30.

The gas turbine engine 10 works in a conventional manner with air in the core airflow A being accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive the high pressure and low pressure turbines 17, 19 before being exhausted through the nozzle 20 to provide some propulsive thrust. The high pressure turbine 17 drives the high pressure compressor 15 by a suitable interconnecting shaft. The fan 23 generally provides the majority of the propulsive thrust. The epicyclic gearbox 30 is a reduction gearbox.

Figure 2:
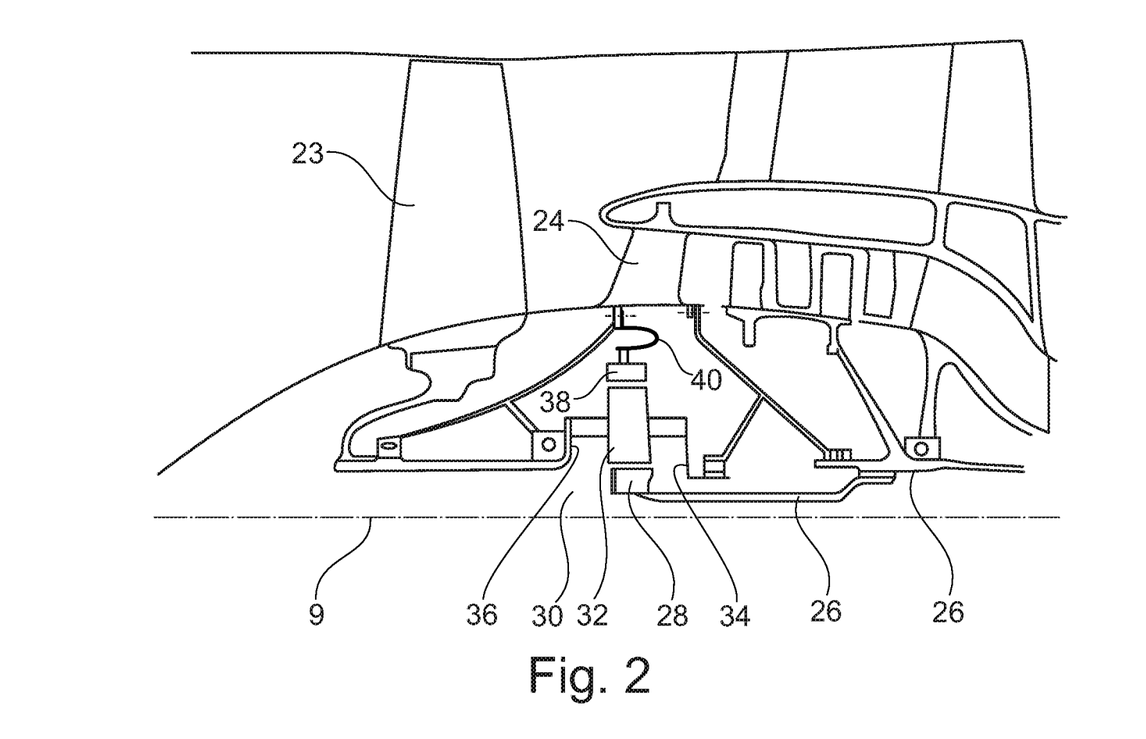
FIG. 2 shows an enlarged schematic view of the gearbox region of the engine of FIG. 1.

A known mechanical arrangement for a two-shaft geared fan gas turbine engine 10 is shown in FIG. 2. The low pressure turbine 19 drives the shaft 26, which is coupled to a sun wheel, or sun gear, 28 of the epicyclic gear arrangement 30. Radially outwardly of the sun gear 28 and intermeshing therewith, in a conventional manner, is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

The epicyclic gearbox 30 is of the planetary type, in that the planet carrier 34 rotates about the sun gear 28 and is coupled to an output shaft via linkages 36. In other applications the gearbox 30 may be a differential gearbox in which the ring gear 38 also rotates in the opposite sense and is coupled to a different output shaft via linkages 40. An epicyclic gearbox 30 must be lubricated, by oil or another fluid. However, the oil becomes heated by being worked during operation of the epicyclic gearbox 30.

Wear of the gears and other rotating parts in the gearbox generates wear debris that is suspended in the oil that is used to lubricate and cool the gearbox. This wear debris can itself be problematic as it can cause further wear and damage to the meshing gears. Conventional techniques for removing wear particles from the oil generally require the oil to be continually circulated through a filter of some kind. This requires a pump and associated housings and pipework, which add weight, complexity and require energy to power.

STATEMENTS OF DISCLOSURE

According to a first aspect of the present disclosure there is provided a debris collection arrangement for an epicyclic geartrain, the epicyclic geartrain comprising a sun gear; a plurality of planet gears, the plurality of planet gears supported by a planet torque ring; and a ring gear, the planet gears meshingly surround the sun gear, and the ring gear meshingly surrounds the planet gears, wherein at least one of the sun gear, and the plurality of planet gears, is provided with a plurality of permanent magnet portions, and a debris collection element, the plurality of magnet portions is arranged as a circumferential array, the debris collection element extends along a side face of the corresponding gear, and the debris collection element is slidably positioned against the side face, such that rotation of the gear causes the debris collection element to remove any ferromagnetic debris particles that are magnetically attached to the side face.

Providing one or more of the gears within the geartrain with an array of magnet portions causes ferromagnetic debris particles to magnetically attach themselves to the side face(s) of the or each gear, and the debris collection element can then be used to remove the debris particles from the side face of the gear. This makes the debris collection arrangement of the present disclosure both simpler, lighter than prior art filtration arrangements.

In one arrangement, the debris collection element is a passive element that simply accumulates the ferromagnetic debris particles as they are removed from the side face of the gear. Consequently, no additional moving parts are required for the debris collection arrangement.

In the following disclosure, discussion of the movement of ferromagnetic debris particles implicitly includes the movement of the volumes of oil surrounding these particles. Mention of the movement of debris particles should therefore be taken to also include the movement of these oil volumes unless explicitly stated otherwise.

Optionally, the debris collection element comprises a transfer portion and a collection portion, the transfer portion has, in sequence, a leading edge, a transfer surface, and a trailing edge, the leading edge being slidably positioned against the side face, the collection portion extends from the trailing edge, and the collection portion has a 'C'-shaped cross-sectional profile in which an open portion of the 'C'-shaped profile faces towards the transfer surface, such that rotation of the gear causes ferromagnetic debris particles that are magnetically attached to the side face to be transferred over the leading edge, onto the transfer surface, and across the trailing edge and into the collection portion.

The debris collection element acts as a scraper that slides over the side face of the gear to remove any accumulated ferromagnetic debris particles. The leading edge is slidably positioned against the side face of the gear causing any debris particles attracted to the magnet portions to be transferred onto the transfer surface, across the transfer surface, and deposited into the collection portion.

In one arrangement, the debris collection element is formed as a shaped sheet component that is slidably positioned against the side face of the gear. A linear leading edge sliding against the side face of the gear merges into an essentially planar transfer surface that, in turn, merges into a collection portion having a 'C'-shaped sectional profile. This sheet arrangement is simple and cheap to manufacture, and can readily be installed in the epicyclic geartrain against a side face of a gear.

Optionally, one edge of the open portion of the 'C'-shaped profile is contiguous with the trailing edge, and at least part of the inner volume of the 'C'-shaped profile extends in a direction opposite to an outwardly facing side of the transfer surface.

In an alternative arrangement, the collection portion is offset from a plane of the transfer surface such that at least part of the inwardly facing surface of the 'C'-shaped profile is positioned to be closer to the side face of the gear than is the trailing edge of the transfer portion. This means that rotation of the gear causes debris particles attached to the side face of the gear to transit across the leading edge, over the transfer surface, across the trailing edge, and then into the collection portion. As the debris particle move across the transfer surface, they move further away from the side face of the gear. When they cross the trailing edge and move into the 'C'-shaped collection portion, they move closer to the side face of the gear. This means that once the debris particles have moved into the collection portion they become retained in the collection portion by the continuous transfer of debris particles.

Optionally, the transfer surface is inclined relative to the side face of the corresponding gear.

The inclination of the transfer surface causes the debris particles to be lifted away from the side face of the gear and in a direction away from the magnet portions. This results in the magnetic force on the debris particles being reduced and so further easing their transfer away from the side face of the gear.

Notwithstanding this point, the residual magnetic force applied to the debris particles by the magnet portions as the debris particles transit across the transfer surface means that the debris particles do not return to the bulk oil volume surrounding the geartrain. This improves the efficiency of the debris collection arrangement.

Optionally, the leading edge of the transfer portion extends radially along the side face of the corresponding gear.

Positioning the leading edge of the transfer portion radially along the side face of the gear ensures that the leading edge is normal to the direction of movement of the side face of the gear. This in turn eases the transit of the debris particles onto the transfer surface and into the collection portion, and improves the transfer efficiency of the debris collection arrangement.

Optionally, a longitudinal axis of the collection portion extends radially along the side face of the corresponding gear.

Positioning the collection portion radially along the side face of the gear ensures that the collection portion is normal to the direction of movement of the side face of the gear. This in turn eases the transit of the debris particles from the transfer surface into the collection portion, and so improves the transfer efficiency of the debris collection arrangement.

Optionally, the leading edge of the transfer portion extends along the side face of the corresponding gear at an offset angle to a radius of the gear.

By positioning the leading edge of the transfer portion at an offset angle to a radius of the gear, it is possible to increase or decrease the rate at which debris particles are transferred radially outwardly along the collection portion. This enables a user to tailor the performance of the debris collection arrangement to an expected quantity of debris particles for a given time, such as between maintenance intervals.

Inclining the leading edge of the transfer portion, in a radially outwardly sense, towards the direction of rotation of the gear will slow the rate at which debris particles transit radially outwardly along the collection portion.

Conversely, inclining the leading edge of the transfer portion, in a radially outwardly sense, away from the direction of rotation of the gear will increase the rate at which debris particles transit radially outwardly along the collection portion.

Optionally, each one of plurality of magnet portions is attached to the side face of the corresponding gear, and the debris collection element is positioned to slide over the plurality of magnet portions.

In one arrangement, the magnet portions are attached to a side face of the gear and the debris collection element is arranged to slide over an axially outwardly facing surface of the magnet portions.

In an alternative arrangement, the magnet portions are integrally formed with the gear and the debris collection element is arranged to slide over the side face (i.e. the axially outwardly facing surface) of the gear itself.

Optionally, a radially outward end of the collection portion fluidly communicates with a filter element, and the filter element being in fluid communication with an oil reservoir for the epicyclic geartrain.

The rotation of the gear causes a transfer flow of debris particles and an associated oil volume into the collection portion of the debris collection element. This transfer flow may be exploited to allow a filter Optionally, a radially outward end of the collection portion is provided with a magnetic debris collection plug.

In this arrangement, a magnetised debris collection plug is positioned at a radially outward end of the collection portion to magnetically attract and secure the debris particles that have been removed from the side face of the gear by the debris collection element. The debris collection plug can conveniently be positioned such that it can be removed and cleaned during routine maintenance operations.

According to a second aspect of the present disclosure there is provided a geared turbofan engine comprising:
a fan;
a core gas turbine engine; and
an epicyclic gearbox,
wherein the gearbox connects the fan to the core gas turbine engine, and the gearbox comprises an debris collection arrangement according to the first aspect.

The debris collection arrangement of the present disclosure improves the efficiency with which wear debris particles can be removed from the epicyclic gearbox, relative to prior art techniques.

Other aspects of the disclosure provide devices, methods and systems which include and/or implement some or all of the actions described herein. The illustrative aspects of the disclosure are designed to solve one or more of the problems herein described and/or one or more other problems not discussed.

BRIEF DESCRIPTION OF THE DRAWINGS

There now follows a description of an embodiment of the disclosure, by way of non-limiting example, with reference being made to the accompanying drawings in which.

It is noted that the drawings may not be to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 3:
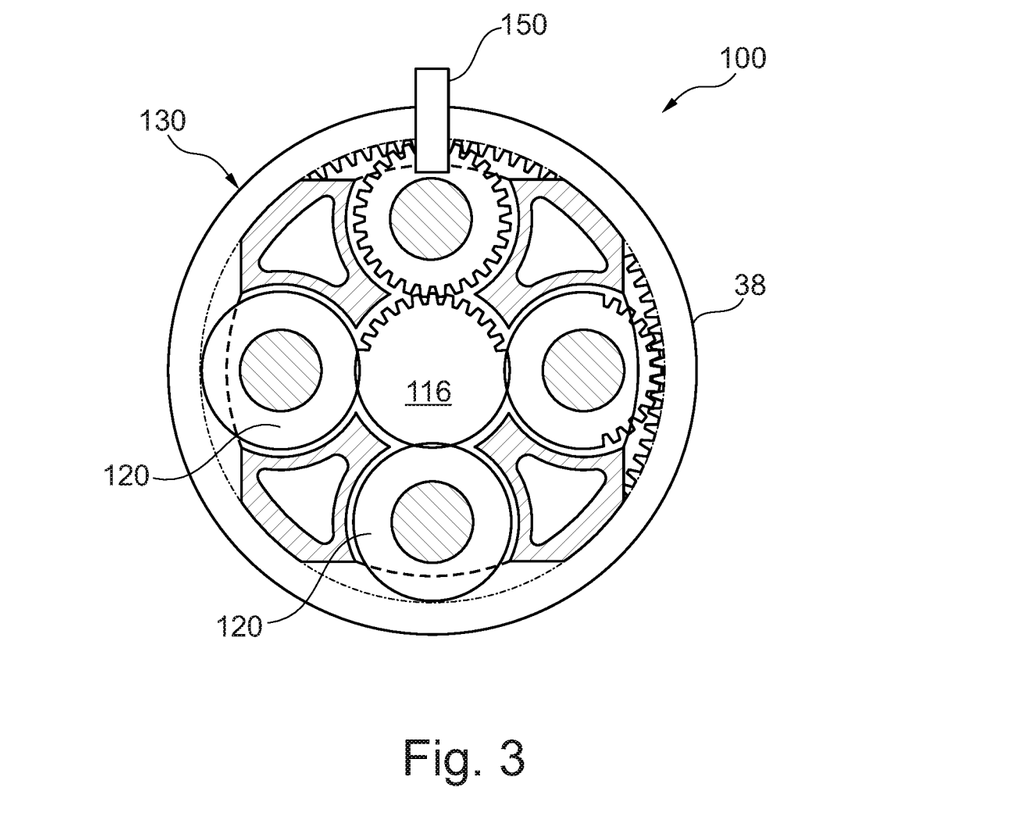
FIG. 3 shows a schematic axial view of the gearbox of the engine of FIG. 1.

A typical arrangement of the epicyclic gearbox 30 used in a geared turbofan gas turbine engine 10 is shown in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

Referring to FIG. 3, a debris collection arrangement for an epicyclic geartrain, according to an embodiment of the disclosure is designated generally by the reference numeral 100.

Figure 4:
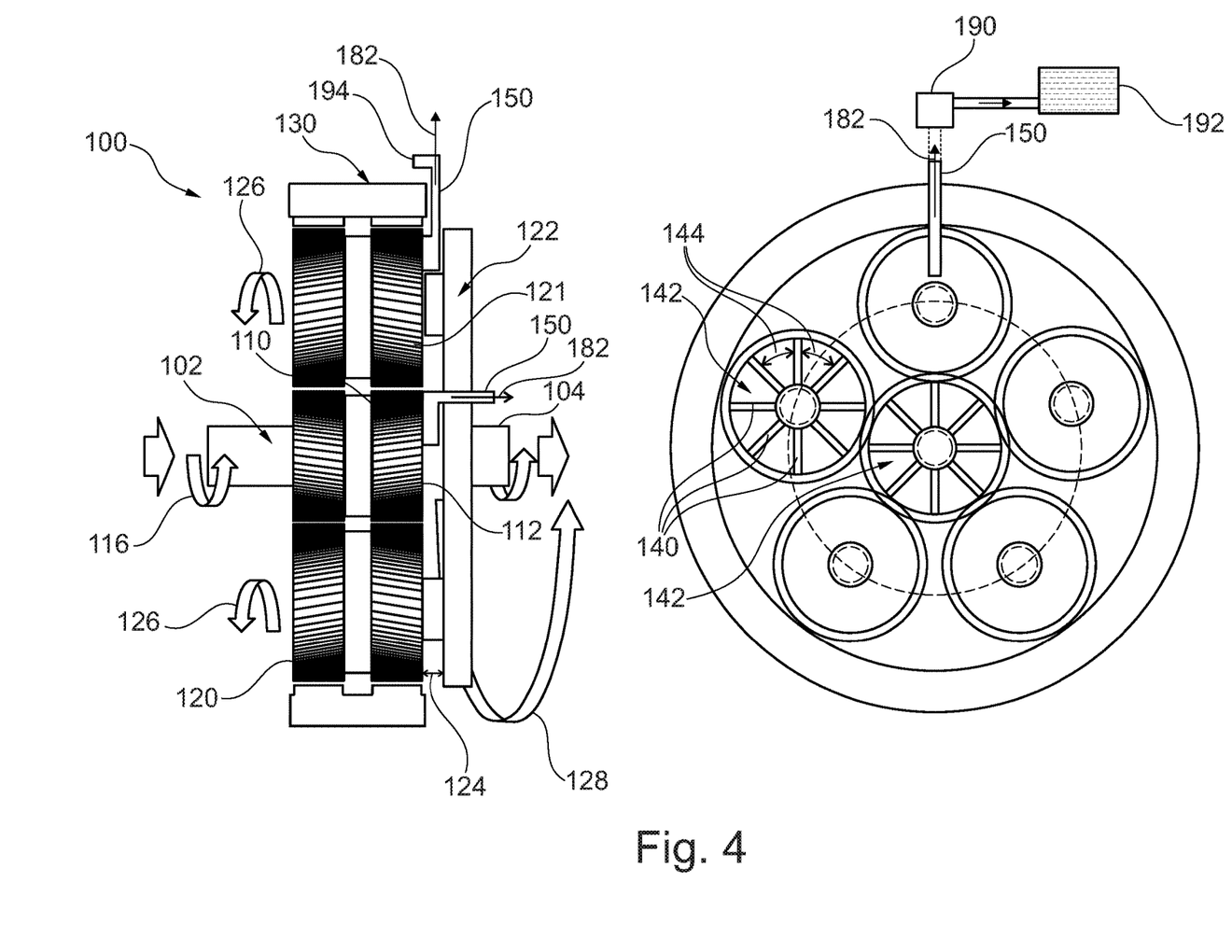
FIG. 4 shows schematic cross-sectional and axial views of the debris collection arrangement of the present disclosure, illustrating the debris collection element placement.

As illustrated in FIG. 4, the epicyclic geartrain 30 comprises a sun gear 110, a plurality of planet gears 120, and a ring gear 130. Each of the plurality of planet gears 120 is rotationally attached to a planet torque ring 122. Each of the planet gears 120 is free to rotate relative to the planet torque ring 122.

In the present embodiment, the epicyclic geartrain 30 is configured in a planetary configuration, in which the sun gear 110 rotates in a first direction 116, and the planet torque ring 122 (together with the plurality of planet gears 120) rotates in a second opposite direction 128, while the ring gear 130 remains stationary. The epicyclic geartrain 30 of the present disclosure may however equally be applied to epicyclic geartrain configurations of the star or differential form.

The planet torque ring 122 is positioned in an axial plane. The planet torque ring 122 is axially offset from the ring gear 130 by an axial clearance 124.

In the present embodiment the epicyclic geartrain 30 comprises five planet gears 120. As outlined above, other embodiments of the disclosure may comprise an alternative quantity, say four or six for example, of planet gears 120.

Each of the planet gears 120 meshes with the sun gear 120, and the planet gears are positioned to surround the sun gear 110. The ring gear 130 meshes with each of the planet gears 120, and the ring gear 130 is positioned to surround the planet gears 120.

The sun gear 110 and the ring gear 130 are positioned to be coaxial. The planet gears 120 are arranged in a circumferential array around the sun gear 110.

Each of the sun gear 110, the planet gears 120, and the ring gear 130 is provided with a plurality of permanent magnet portions 140. For each of the sun gear 110, the planet gears 120, and the ring gear 130, the plurality of permanent magnet portions 140 are arranged as a circumferential array 142. In other words, each of the sun gear 110, the planet gears 120, and the ring gear 130, itself comprises a circumferential array of permanent magnet portions 140.

In the present embodiment, each circumferential array 142 of permanent magnet portions 140 is integrally formed with a respective one of the sun gear 110, the planet gears 120, and the ring gear 130. In other words, the circumferential array 142 of permanent magnet portions 140 is embedded in the body of the respective sun gear 110, planet gear 120, and ring gear 130.

In the present embodiment, the sun gear 110 and each of the planet gears 120 is provided with a debris collection element 150. In the case of the planet gears 120, each debris collection element 150 is located on the planet torque ring 122, with the debris collection element 150 directed radially outwardly. This orientation simplifies the flow 182 of debris particles and associated oil. However, the debris collection elements 150 may be oriented at positions other than radially outwardly.

Each debris collection element 150 extends along a side face 112:121 of the corresponding sun gear 110 and planet gears 120. Each debris collection element 150 is slidably positioned against the side face 112:121.

Figure 6:
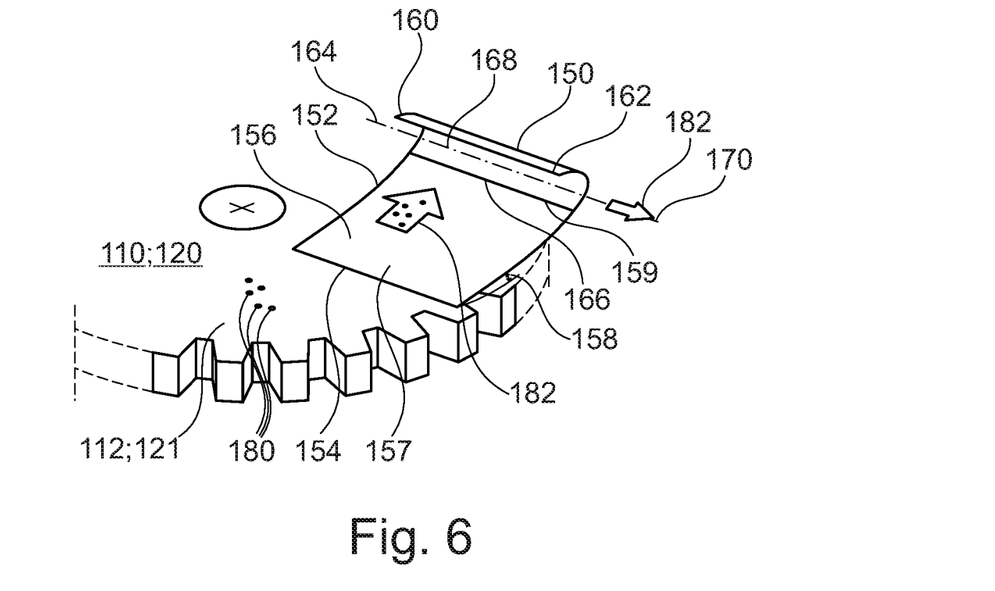
FIG. 6 shows a schematic perspective view of a first embodiment of the debris collection element.

FIG. 6 illustrates a first embodiment of the debris collection element 150. The debris collection element 150 comprises a transfer portion 152 and a collection portion 160. The transfer portion 152 has, in sequence, a leading edge 154, a transfer surface 156, and a trailing edge 159. The leading edge 154 is slidably positioned against the side face 112:121. The collection portion 160 extends from the trailing edge 159. The collection portion 160 has a 'C'-shaped cross-sectional profile 162. An open portion 164 of the 'C'-shaped cross-sectional profile 162 faces towards the transfer surface 156.

In this embodiment, one edge 166 of the open portion 164 of the 'C'-shaped cross-sectional profile 162 is contiguous with the trailing edge 159. The transfer surface 156 is inclined relative to the side face 112:121 by an inclination angle 158.

Figure 5A:
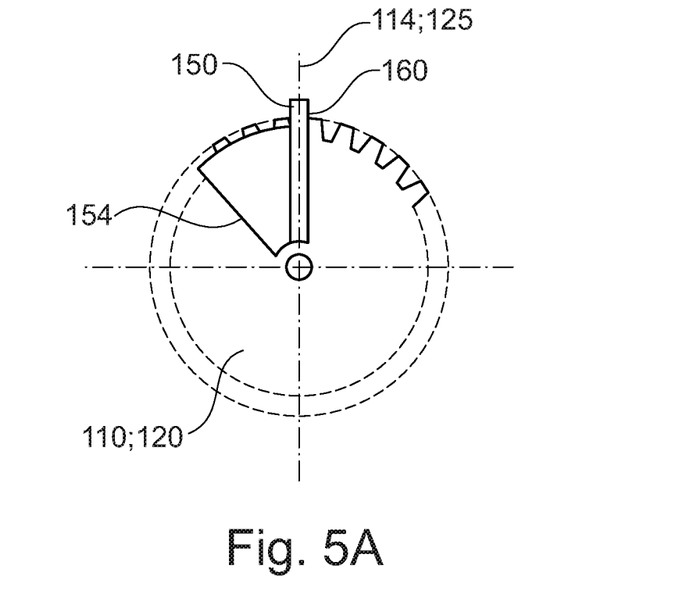
FIGS. 5A and 5B illustrate respectively the debris collection element aligned with a radius of the corresponding gear, and the debris collection element being offset from a radius of the corresponding gear.

The collection portion 160 of the debris collection element 150 has a longitudinal axis 170. In this embodiment, as illustrated in FIG. 5A, the longitudinal axis 170 is aligned with a radius 114:125 of the sun gear 110 and planet gears 120. In the arrangement of FIG. 5A, the leading edge 154 of the transfer portion 152, is also aligned with a radius 114:125 of the gear 110:120.

Figure 5B:
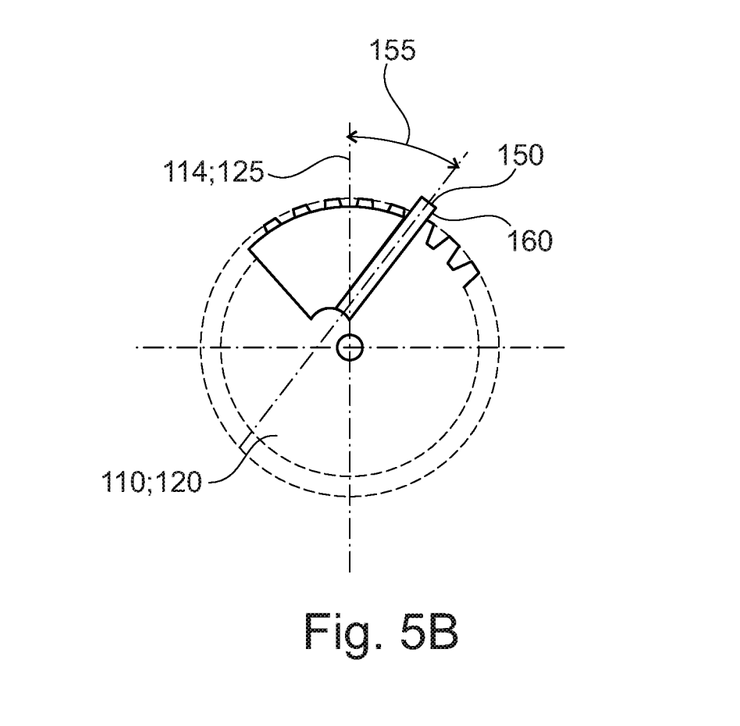

In an alternative arrangement, shown in FIG. 5B, the longitudinal axis 170 is angularly offset from the radius 114:125 by an offset angle 155.

Figure 7:
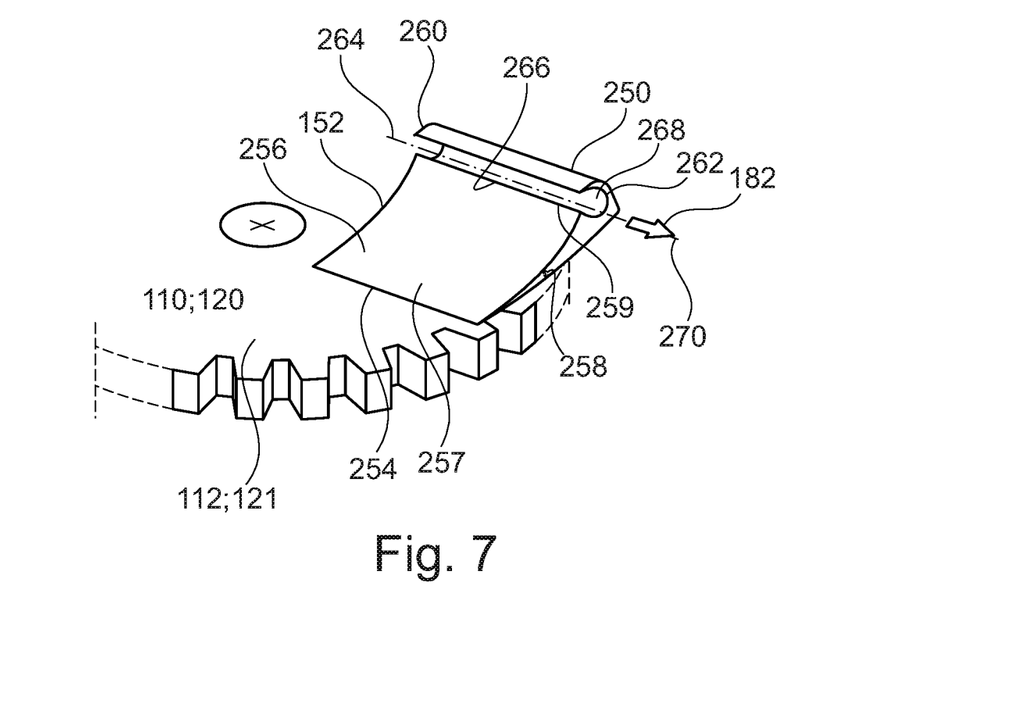
FIG. 7 shows a schematic perspective view of a second embodiment of the debris collection element.

Referring to FIG. 7, a debris collection element according to a second embodiment of the disclosure is designated generally by the reference numeral 250.

The debris collection element 250 has a transfer portion 252 and a collection portion 260. As in the first embodiment, the transfer portion 252 has, in sequence, a leading edge 254, a transfer surface 256, and a trailing edge 259, with the leading edge 254 being slidably positioned against the side face 112:121. The collection portion 260 extends from the trailing edge 259, and has a 'C'-shaped cross-sectional profile 262. An open portion 264 of the 'C'-shaped cross-sectional profile 262 faces towards the transfer surface 256.

One edge 266 of the open portion 264 of the 'C'-shaped cross-sectional profile 262 is contiguous with the trailing edge 259. The transfer surface 256 is inclined relative to the side face 112:121 by an inclination angle 258. At least a part of the inner volume 268 of the 'C'-shaped cross-sectional profile 262 extends in a direction opposite to an outwardly facing side 257 of the transfer surface 256.

In use, ferromagnetic wear debris particles 180 that are generated by the epicyclic gearbox 30 become suspended in the volume of oil within the gearbox 30. The presence of the magnet portions 140 at the side faces 112:121 of the gears 110:120 result in these ferromagnetic debris particles 180 becoming attached by magnetic force to the side faces 112:121. The rotation of the gear 110:120 causes the debris collection element 150 to remove these ferromagnetic debris particles 180 by a 'scooping' or 'scraping' action.

The inclination of the transfer surface 156:256 relative to the side face 112:121 results in the magnetic force on each debris particle 180 reducing as the particle 180 moves across the transfer surface 156:256 from the leading edge 154:254 to the trailing edge 159:259, because the particle 180 moves further away from the side face 112:121 in an axial direction.

When the particles 180 reach the collection portion 160:260, they become trapped within the 'C'-shaped cross-sectional profile 162:262. The 'C'-shaped cross-sectional profile 162:262 reduces the magnetic field from the magnet portions 140, which assists the transit of the debris particles 180 into the collection portion 160:260.

The debris particles may be retained within the debris collection element 150:250, which is then cleaned during routine maintenance of the gearbox 30. In an alternative arrangement, the flow of oil and debris particles 182 passes over a magnetic debris collection plug 194, as shown in the left hand view in FIG. 4. As shown in the right hand view of FIG. 4, the flow of oil and debris particles 182 may then pass through a filter element 190, with the filtered oil being returned to an oil reservoir 194.

Although some of the debris particles 180 may escape from the collection portion 160, the magnet portions 140 extending over the side face 112:121 of the gear 110:120 will quickly trap the particles 180, which will be recycled over the debris collection element 150.

Various example embodiments of the invention are described herein. Reference is made to these examples in a non-limiting sense. They are provided to illustrate more broadly applicable aspects of the invention. Various changes may be made to the invention described and equivalents may be substituted without departing from the scope of the invention. Further, it will be appreciated by those with skill in the art that each of the individual variations described and illustrated herein has discrete components and features which may be readily separated from or combined with the features of any of the other several embodiments without departing from the scope of the present inventions. All such modifications are intended to be within the scope of claims associated with this disclosure.

In addition, where a range of values is provided, it is understood that every intervening value, between the upper and lower limit of that range and any other stated or intervening value in that stated range, is encompassed within the invention.

Except where mutually exclusive, any of the features may be employed separately or in combination with any other features and the disclosure extends to and includes all combinations and sub-combinations of one or more features described herein.

The foregoing description of various aspects of the disclosure has been presented for purposes of illustration and description. It is not intended to be exhaustive or to limit the disclosure to the precise form disclosed, and obviously, many modifications and variations are possible. Such modifications and variations that may be apparent to a person of skill in the art are included within the scope of the disclosure as defined by the accompanying claims.

What is claimed is:

1. A debris collection arrangement for an epicyclic geartrain, the epicyclic geartrain comprising a sun gear; a plurality of planet gears, the plurality of planet gears supported by a planet torque ring; and a ring gear, the planet gears meshingly surround the sun gear, and the ring gear meshingly surrounds the planet gears, wherein at least one of the sun gear, and the plurality of planet gears, is provided with a plurality of permanent magnet portions, and a debris collection element, the plurality of magnet portions is arranged as a circumferential array, the debris collection element extends along a side face of the corresponding gear, and the debris collection element is slidably positioned against the side face, such that rotation of the gear causes the debris collection element to remove any ferromagnetic debris particles that are magnetically attached to the side face.

2. The debris collection arrangement as claimed in claim 1, wherein the debris collection element comprises a transfer portion and a collection portion, the transfer portion has, in sequence, a leading edge, a transfer surface, and a trailing edge, the leading edge being slidably positioned against the side face, the collection portion extends from the trailing edge, and the collection portion has a 'C'-shaped cross-sectional profile in which an open portion of the 'C'-shaped profile faces towards the transfer surface, such that rotation of the gear causes ferromagnetic debris particles that are magnetically attached to the side face to be transferred over the leading edge, onto the transfer surface, and across the trailing edge and into the collection portion.

3. The debris collection arrangement as claimed in claim 2, wherein one edge of the open portion of the 'C'-shaped profile is contiguous with the trailing edge, and at least part of the inner volume of the 'C'-shaped profile extends in a direction opposite to an outwardly facing side of the transfer surface.

4. The debris collection arrangement as claimed in claim 2, wherein the transfer surface is inclined relative to the side face of the corresponding gear.

5. The debris collection arrangement as claimed in claim 2, wherein the leading edge of the transfer portion extends radially along the side face of the corresponding gear.

6. The debris collection arrangement as claimed in claim 2, wherein a longitudinal axis of the collection portion extends radially along the side face of the corresponding gear.

7. The debris collection arrangement as claimed in claim 2, wherein the leading edge of the transfer portion extends along the side face of the corresponding gear at an offset angle to a radius of the gear.

8. The debris collection arrangement as claimed in claim 1, wherein each one of plurality of magnet portions is attached to the side face of the corresponding gear, and the debris collection element is positioned to slide over the plurality of magnet portions.

9. The debris collection arrangement as claimed in claim 1, wherein a radially outward end of the collection portion fluidly communicates with a filter element, and the filter element being in fluid communication with the oil reservoir for the epicyclic geartrain.

10. The debris collection arrangement as claimed in claim 1, wherein a radially outward end of the collection portion is provided with a magnetic debris collection plug.

11. A geared turbofan engine comprising:
a fan;
a core gas turbine engine; and
an epicyclic gearbox,
wherein the gearbox connects the fan to the core gas turbine engine, and the gearbox comprises an debris collection arrangement as claimed in claim 1.

\* \* \* \* \*